United States Patent
Sun

(10) Patent No.: US 9,883,142 B1
(45) Date of Patent: Jan. 30, 2018

(54) AUTOMATED COLLABORATION SYSTEM

(71) Applicant: Cisco Technology, Inc., San Jose, CA (US)

(72) Inventor: HaoHai Sun, Nesbru (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/464,366

(22) Filed: Mar. 21, 2017

(51) Int. Cl.
```
H04N 7/14      (2006.01)
H04N 7/15      (2006.01)
G10L 15/32     (2013.01)
H04L 29/06     (2006.01)
```

(52) U.S. Cl.
CPC .............. *H04N 7/15* (2013.01); *G10L 15/32* (2013.01); *H04L 65/1083* (2013.01)

(58) Field of Classification Search
CPC . H04L 12/1822; H04L 12/1827; H04L 51/24; H04M 3/356; H04N 5/222; H04N 5/224; H04N 5/247; C07D 231/08; C07D 249/08; G06B 15/06; G06B 5/10; G06F 3/0488; G06F 3/04812; G06Q 10/109; G06Q 10/1095
USPC ......... 348/14.01, 14.07, 14.08, 14.09, 14.12, 348/14.14, 14.16
See application file for complete search history.

(56) References Cited

U.S. PATENT DOCUMENTS

| | | | |
|---|---|---|---|
| 7,468,778 B2 * | 12/2008 | Thomas ................. | G03B 15/06 348/E5.022 |
| 7,750,892 B2 | 7/2010 | Hildebrandt et al. | |
| 8,270,632 B2 | 9/2012 | Hwang et al. | |
| 8,990,706 B2 * | 3/2015 | Pegg ...................... | H04M 3/567 715/751 |
| 9,129,223 B1 | 9/2015 | Velusamy et al. | |
| 9,338,544 B2 | 5/2016 | Sun et al. | |
| 9,398,258 B1 | 7/2016 | Sandvik et al. | |
| 9,473,740 B2 | 10/2016 | Schaefer et al. | |
| 9,489,948 B1 | 11/2016 | Chu et al. | |
| 9,659,280 B2 * | 5/2017 | Bragdon ............ | G06Q 10/1095 |
| 2012/0293606 A1 | 11/2012 | Watson et al. | |

(Continued)

OTHER PUBLICATIONS

Cisco; Cisco PresenterTrack available on the web at: http://www.cisco.com/c/en/us/products/collaboration-endpoints/presenter-track.html; viewed Jan. 2017.

(Continued)

*Primary Examiner* — Binh K Tieu
(74) *Attorney, Agent, or Firm* — Samuel M. Katz

(57) ABSTRACT

In one embodiment, a method includes retrieving positions P1, P2 and P3 of a first, second and third attendee position, respectively, P1, P2, P3 being determined based on detecting speech from the first, second and third attendee position, respectively, by a first microphone array of a first collaboration apparatus, retrieving distances D1, D2 and D3 from the first, second and third attendee position, respectively, to a second microphone array of a second collaboration apparatus, D1, D2, D3 being determined based on detecting speech from the first, second and third attendee position, respectively, by the second microphone array, P1 and D1 defining a circle C1 centered at P1 with radius D1, P2 and D2 defining a circle C2 centered at P2 with radius D2, P3 and D3 defining a circle C3 centered at P3 with radius D3, calculating a position P4 based on a proximity of a circumference of C1, C2 and C3.

18 Claims, 7 Drawing Sheets

(56) References Cited

U.S. PATENT DOCUMENTS

2015/0007055 A1 1/2015 Lemus et al.
2016/0134838 A1 5/2016 Tangeland et al.
2016/0277345 A1* 9/2016 Mochizuki .......... H04L 12/1822

OTHER PUBLICATIONS

Goumopoulos, C. et al.; "Bridging the Gap between Virtual and Physical Classrooms to Enhance Distance Learning Experience." 2015 International Conference on Intelligent Environments, Prague, 2015, pp. 112-119.
Hassan, N.S.A., et al.; "Development of indoor 3D location tracking in IPv6 network." 2010 IEEE Symposium on Industrial Electronics and Applications (ISIEA), Penang, 2010, pp. 317-322.
Kagami, Satoshi et al.; "Calling from the other room by Calling Ultrasonic Locator and Microphone Array." 2007 IEEE/RSJ International Conference on Intelligent Robots and Systems, San Diego, CA, 2007, pp. 2028-2034.
Plinge, A. et al.; "Geometry calibration of distributed microphone arrays exploiting audio-visual correspondences." 2014 22nd European Signal Processing Conference (EUSIPCO), Lisbon, 2014, pp. 116-120.
Smaragdis, P.; "Position and Trajectory Learning for Microphone Arrays" in IEEE Transations on Audio, Speech and Language Processing; vol. 15, Issue: 1, Jan. 2007.
Yang, L., et al.; "An Approximately Efficient TDGA Localization Algorithm in Closed-Form for Locating Multiple Disjoint Sources With Erroneous Sensor Positions," in IEEE Transactions on Signal Processing, vol. 57, No. 12, pp. 4598-4615, Dec. 2009.

* cited by examiner

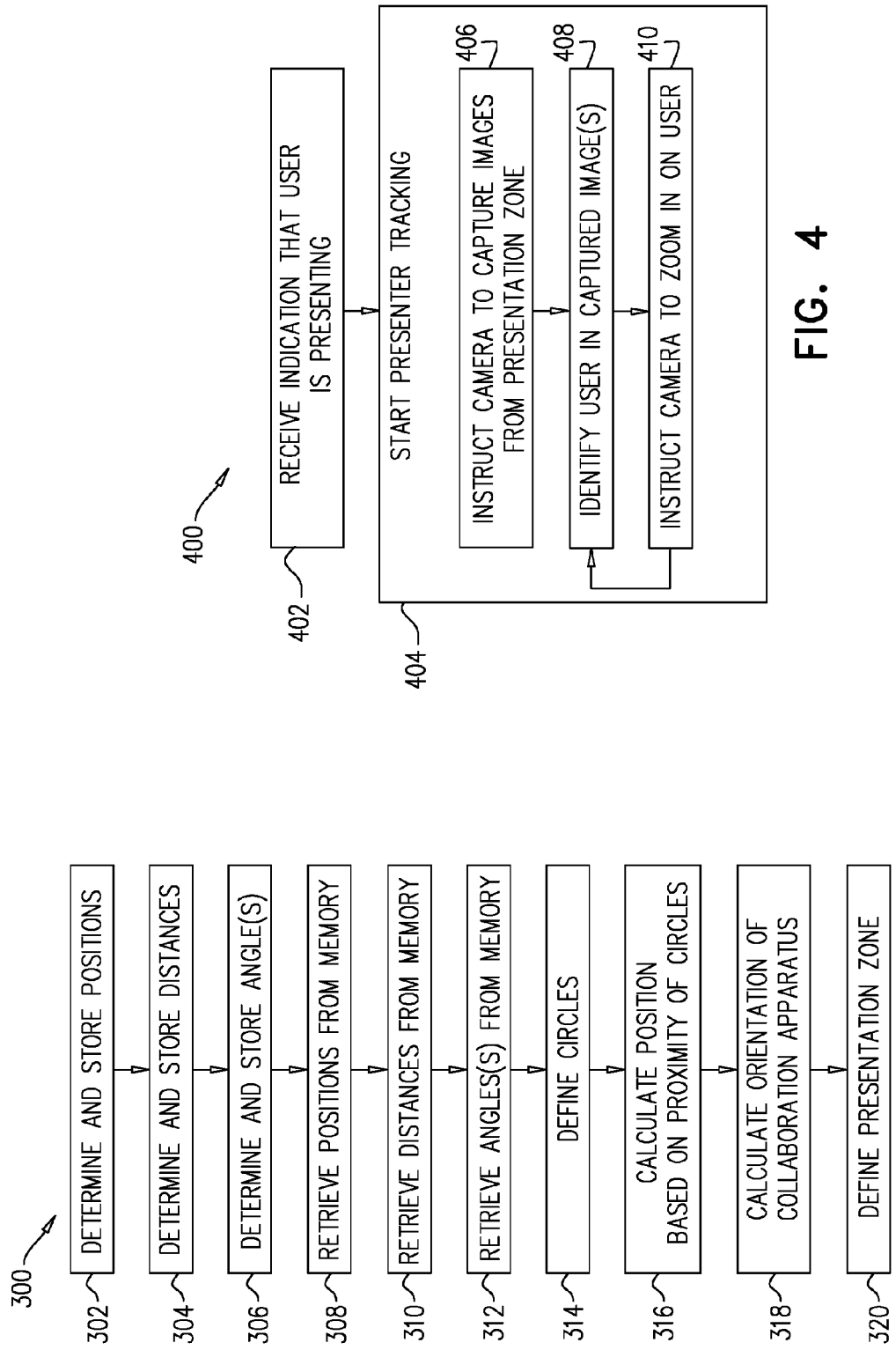

AUTOMATED COLLABORATION SYSTEM

TECHNICAL FIELD

The present disclosure generally relates to collaboration.

BACKGROUND

Cisco PresenterTrack technology for video conferences detects and tracks presenters as they stand to present, and naturally move about in front of the room as if they were on stage. This gives presenters more flexibility and the audience a much better visual experience. Before PresenterTrack, presenters standing in the front of the video collaboration room would have the backs of their heads to audiences participating remotely in the video conference. Standing up, a presenter could more easily address the audience in the room, but then could not be seen by the remote audience. For that reason, presenters would avoid standing up in video conferences, even if they wanted to do so. Now, with PresenterTrack, presenters no longer have that limitation and can move about more freely. Tracking is activated when the presenter enters a pre-defined area, or "trigger zone" and keeps presenters visible in the video conference and at a high zoom level until they leave the presentation area. The "trigger zone" is user defined and the position of the "trigger zone" may not be known by some users.

BRIEF DESCRIPTION OF THE DRAWINGS

The present disclosure will be understood and appreciated more fully from the following detailed description, taken in conjunction with the drawings in which:

FIG. 3 is a first flow chart showing exemplary steps in a method of operation of the system of FIG. 1; and FIG. 4 is a second flow chart showing exemplary steps in a method of operation of the system of FIG. 1.

DESCRIPTION OF EXAMPLE EMBODIMENTS

Overview

There is provided in accordance with an embodiment of the present disclosure, a method including retrieving, from a memory, a position P1, a position P2 and a position P3 of a first attendee position, a second attendee position and a third attendee position, respectively, wherein the positions P1, P2, P3 are determined based on detecting speech from the first attendee position, the second attendee position and the third attendee position, respectively, by a first microphone array of a first collaboration apparatus, retrieving, from a memory, a distance D1, a distance D2 and a distance D3 from the first attendee position, the second attendee position and the third attendee position, respectively, to a second microphone array of a second collaboration apparatus, wherein the distances D1, D2, D3 are determined based on detecting speech from the first attendee position, the second attendee position and the third attendee position, respectively, by the second microphone array, the position P1 and distance D1 defining a circle C1 centered at position P1 with a radius D1, the position P2 and distance D2 defining a circle C2 centered at position P2 with a radius D2, the position P3 and distance D3 defining a circle C3 centered at position P3 with a radius D3, and calculating a position P4 based on a proximity of a circumference of the circle C1, a circumference of the circle C2 and a circumference of the circle C3, the position P4 defining a position of the second collaboration apparatus.

Detailed Description

Figure 1:
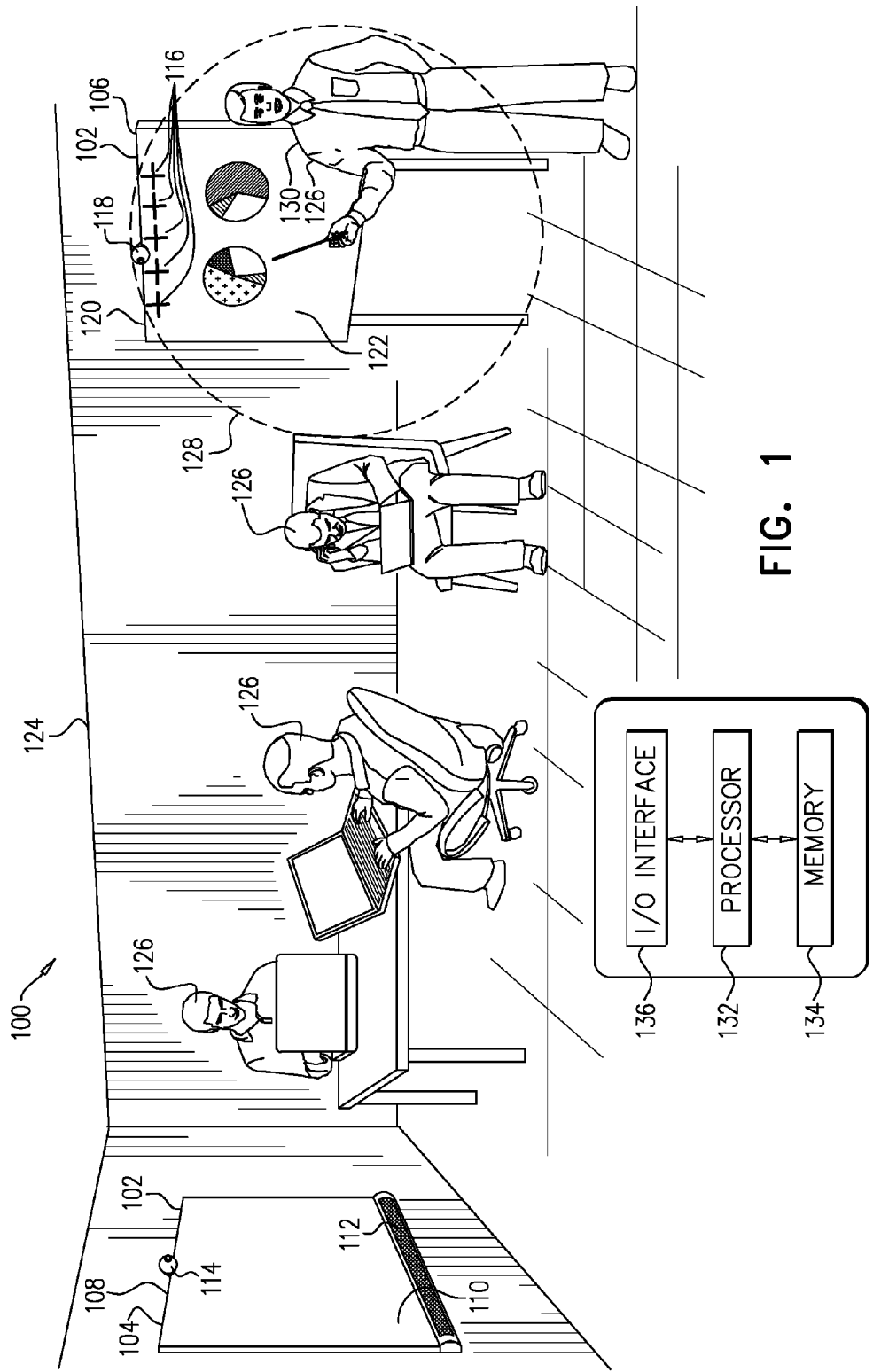
FIG. 1 is a partly pictorial, partly block diagram view of a collaboration system constructed and operative in accordance with an embodiment of the present disclosure.

Reference is now made to FIG. 1, which is a partly pictorial, partly block diagram view of a collaboration system 100 constructed and operative in accordance with an embodiment of the present disclosure. It should be noted that the reference numerals listed in FIG. 1 are in the 100-199 range, and the reference numerals in FIGS. 2A-E are in the 200-299 range and so on with all the figures. Therefore, when reference numerals are being discussed, the reader will immediately know which figure(s) the reference numeral appears in.

The collaboration system 100 includes collaboration equipment 102 including a collaboration apparatus 104 and a collaboration apparatus 106. The collaboration apparatus 104 may include a video end-point 108 having a display screen 110, a microphone array 112 and at least one camera 114 by way of example only. The video end-point 108 is operationally connected to: one or more other video-end points (not shown) implemented in different collaboration rooms; and/or other collaboration clients, e.g., a WebEx® client or a TelePresence® unit. The video end-point 108 is operative to facilitate video conferences between the different collaboration rooms and/or the other collaboration clients via one or more suitable networks, for example, but not limited to, a local or wide area network, wireless network and/or the Internet. The camera(s) 114 and the microphone array 112 capture video and audio, respectively, for sharing with one or more of the other video end-points and/or the other collaboration clients during a video conference.

The collaboration apparatus 106 may be implemented as a digital white board which may include a touch sensitive screen 122. The collaboration apparatus 106 may also include a video end-point 120 including a microphone array 116 and a camera 118. The video end-point 120 may also be operative to facilitate video conferences with the other video end-points and/or the other collaboration clients. An example of a digital white board is Cisco® Spark Board which includes: the ability to wirelessly present content on the digital white board; white board capabilities typically based on a touch sensitive screen; and video or audio conference facilities.

The video end-point 120 and the video end-point 108 may be operative to work together so that the microphone array 116 and the microphone array 112 capture audio during a video conference and the camera 114 and the camera 118 selectively capture video during a video conference and the display screen 110 and/or the touch sensitive screen 122 display video during a video conference. The touch sensitive screen 122 may be operative to only display video when the touch sensitive screen 122 is not being used to present content or to act as a white board. Alternatively, a certain part of the touch sensitive screen 122 may be used for video and another part may be used at the same time as a white board and/or for presenting content. The touch sensitive screen 122 may optionally include a feature whereby video, presented content and white board functionality are all provided by the touch sensitive screen 122 simultaneously.

The collaboration apparatus 106 may be mobile such that the collaboration apparatus 106 may be positioned anywhere in a collaboration room 124 and may be moved around, for example, by attendees 126 of a video conference to any suitable desired position in the collaboration room 124.

The collaboration system 100 may be operative to perform presenter tracking. As the collaboration apparatus 106 is mobile, the position of the collaboration apparatus 106 may be unknown. Therefore, as a preparatory stage to presenter tracking, the collaboration system 100 is operative to determine a position of the collaboration apparatus 106 in the collaboration room 124. The collaboration system 100 is then operative to define a presentation zone 128 around the position of the collaboration apparatus 106. The position of the collaboration apparatus 106 may be determined or calculated based on speech of the attendees 126 being received by the microphone arrays 112, 116 as will be described in more detail in FIGS. 2A-E, 3 and 4. In general, the collaboration system 100 does not need to output audio to a loud speaker(s) (not shown) of the collaboration system 100 during a video conference in order for the collaboration system 100 to determine the position of the collaboration apparatus 106. Extra sounds outputted during a video conference may be seen as disruptive to the video conference. The position of the collaboration apparatus 106 is typically calculated or determined at the beginning of a video conference when speech of the attendees 126 is detected. The position of the collaboration apparatus 106 may be recalculated or re-determined periodically during the course of the video conference as an optional precaution just in case the collaboration apparatus 106 was moved during the video conference.

An action such as touching the touch sensitive screen 122 or another control of the collaboration apparatus 106 or sharing content with the touch sensitive screen 122 or being within a certain proximity to the collaboration apparatus 106, may trigger presenter tracking. Once presenter tracking has been triggered, the camera 114 or another suitable camera is instructed to capture images from the presentation zone 128. The collaboration system 100 identifies a user 130 in one or more of the captured images and instructs the camera 114 (or other camera) to zoom in to the user 130 in the presentation zone 128 and then follow the user 130 in the presentation zone 128 until the user 130 finishes presenting which may be indicated by the user 130 leaving the presentation zone (based on the face of the user 130 no longer being identified in the presentation zone 128 or halting sharing of content of the touch sensitive screen 122 or after a certain period of inactivity of a white board application (e.g., the touch sensitive screen 122 has not been touched) which was being used by the user 130.

In some embodiments of the present disclosure, the collaboration system 100 may be used to find the position of the collaboration apparatus 106 even if the collaboration apparatus 106 is immobile and is fixed in a certain unknown position in the collaboration room 124. For example, the collaboration apparatus 104 may be installed and its position is known, but the collaboration apparatus 106 may also be installed but its exact position is not determined by the installer. In such a case, the collaboration system 100 may be used to determine the position of the collaboration apparatus 106 in order to configure the collaboration system 100.

It should be noted that whether the collaboration apparatus 106 is mobile or immobile, the collaboration apparatus 106 may be any suitable collaboration apparatus for example, but not limited to, a digital white board and/or a video end-point and/or a presentation monitor for presenting content in meetings. The collaboration apparatus 106 may optionally include a display screen which is not touch sensitive instead of, or in addition to, the touch sensitive screen 122.

The collaboration system 100 includes: a processor 132; a memory 134 to store data used by the processor 132; and an input/output interface 136. The processor 132 is operative to determine the position of the collaboration apparatus 106 and perform presenter tracking described in more detail with references to FIGS. 2A-E, 3 and 4. In some embodiments, the determination of the position and presenter tracking may be partially performed by one or more processors 132 and partially performed by one or more different processors 132 (only one processor 132 is shown in FIG. 1 for the sake of simplicity). The processor 132 and the memory 134 may be implemented in any suitable location, for example, but not limited to, in the collaboration apparatus 104, in the collaboration apparatus 106, in a video conference server, or in a cloud computing environment. When one or more processors 132 are performing the determination of the position and presenter tracking, the processors 132 may be located in the same location or in any suitable choice of multiple locations, for example, but not limited to, in the collaboration apparatus 104 and/or in the collaboration apparatus 106 and/or in a video conference server, and/or in a cloud computing environment. The input/output interface 136 is operative to receive data from other elements, for example, but not limited to, the processor 132, the microphone array 112 and the microphone array 116.

Figure 2A:
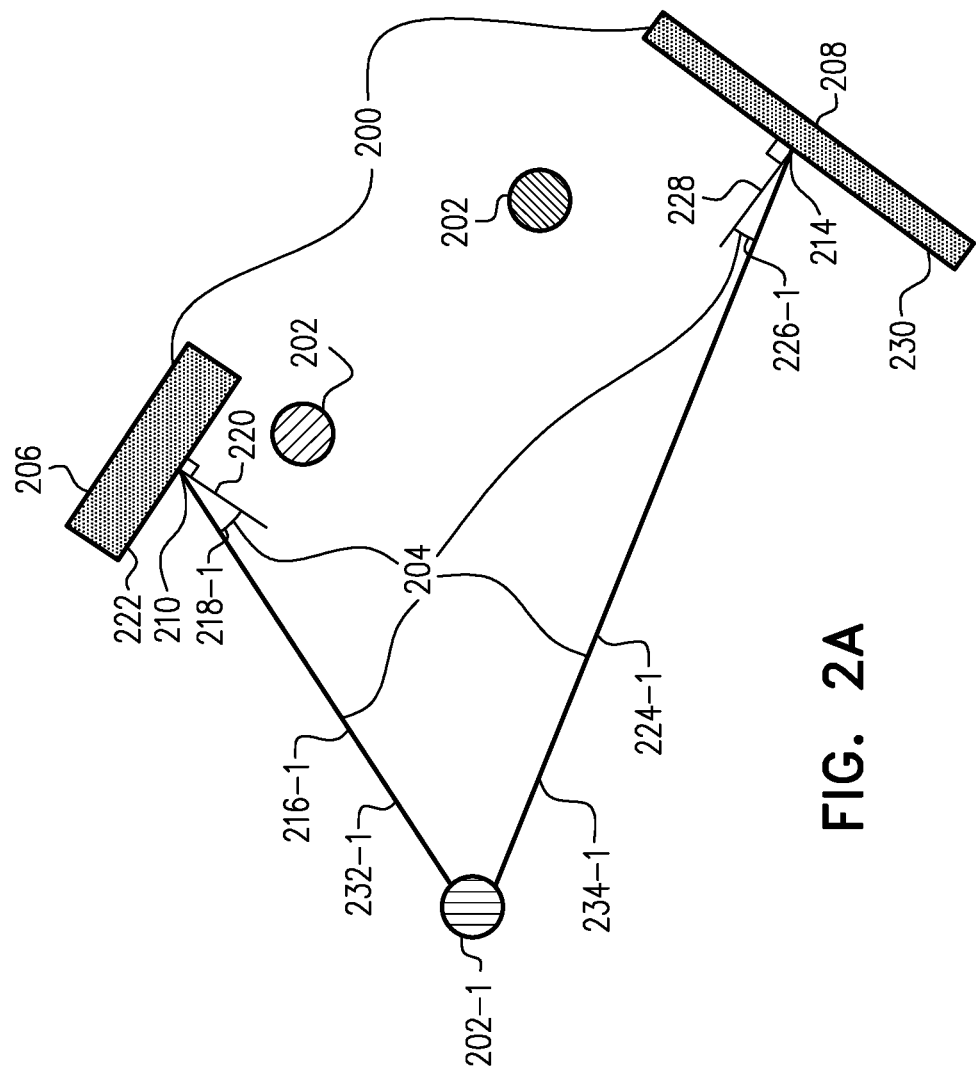
FIG. 2A is a plan view of collaboration equipment, meeting attendees and measurements determined by the system of FIG. 1.

Reference is now made to FIG. 2A, which is a plan view of collaboration equipment 200, a plurality of meeting attendees (people) 202 and a plurality of measurements 204 determined by the system 100 of FIG. 1. It will be appreciated that the collaboration equipment 200 may include the same features as the collaboration equipment 102. The collaboration equipment 200 includes a collaboration apparatus 206 and a collaboration apparatus 208. It will be appreciated that the collaboration apparatus 206 corresponds to the collaboration apparatus 104 of FIG. 1 and the collaboration apparatus 208 corresponds to the collaboration apparatus 106 of FIG. 1. The collaboration apparatus 206 has a known position in a collaboration room and the collaboration apparatus 208 has an unknown position in the collaboration room. The collaboration apparatus 206 includes a microphone array 210. The collaboration apparatus 208 includes a microphone array 214.

Figure 2B:
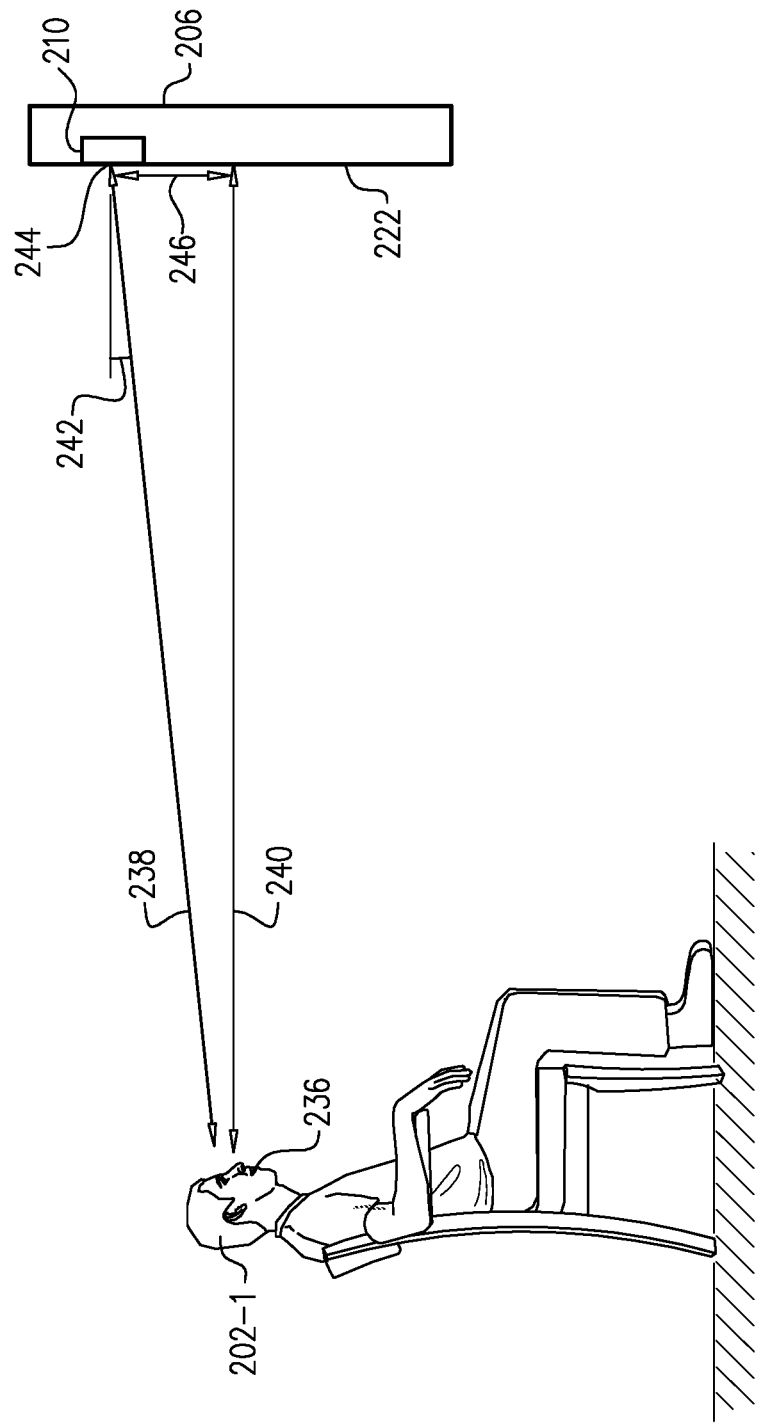
FIG. 2B is a side view of collaboration equipment, a meeting attendee and measurements determined by the system of FIG. 1.

The collaboration system 100 determines a distance 216-1 between the microphone array 210 and the meeting attendee 202-1. Determination of the distance 216-1 is discussed in more detail with reference to FIG. 2B. The discussion with reference to FIG. 2B is generally also relevant to the other distances described herein. The collaboration system 100 determines an angle 218-1 of the meeting attendee 202-1 from the microphone array 210. As shown in the example of FIG. 2A the angle 218-1 is determined as an angle between: (i) a normal 220 to a surface 222 of the collaboration apparatus 206; (ii) and a line 232-1 from the microphone array 210 to the meeting attendee 202-1.

The collaboration system 100 determines a distance 224-1 between the microphone array 214 and the meeting attendee 202-1. The distance 224-1 between the microphone array 214 and the meeting attendee 202-1 may be determined from any suitable point on the microphone array 214 (e.g. from the middle of the microphone array) to the meeting attendee 202-1 as described in more detail with reference to FIG. 2B. The collaboration system 100 determines an angle 226-1 of the meeting attendee 202-1 from the microphone array 214 (e.g., the middle of the microphone array 214). As shown in the example of FIG. 2A the angle 226-1 is determined as an angle between: (i) a normal 228 to a surface 230 of the collaboration apparatus 208; (ii) and a line 234-1 from the microphone array 214 (e.g., the middle of the microphone array 214) to the meeting attendee 202-1.

There are several practical methods that may be used to estimate both angle and distance information, for example, but not limited to, using time difference of arrival (TDOA) as is known in the art. The sound of the speech of the meeting attendee 202-1 is received by the microphone array 210 and the microphone array 214. The sound received by the microphone array 210 is analyzed using TDOA to give the distance 216-1 and angle 218-1 from the microphone array 210 (e.g., the middle of the microphone array 210) to the meeting attendee 202-1. Similarly, the sound received by the microphone array 214 is analyzed using TDOA to give the distance 224-1 and angle 226-1 from the microphone array 214 (e.g., the middle of the microphone array 214) to the meeting attendee 202-1.

In accordance with an embodiment of the present disclosure, angle and distance estimation may be performed using artificial neural network machine learning techniques such that the collaboration system 100 learns how to find the meeting attendees 202 position autonomously, generally without user intervention. For example, at the machine learning algorithm design and training stage, a plurality of attendee positions are predefined (with known predefined angles and distances) and a sound is played at each of the predefined attendee positions. The sounds are recorded using the microphone array 210 and the microphone array 214. The recorded sounds are processed to yield a plurality of signal strength records. Each of the signal strength records may be labelled with the corresponding predefined attendee position (distance and angle) and the corresponding microphone array 210, 214 and/or apparatus 206, 208 associated with the signal strength record. When the collaboration system 100 receives sound signals from the microphone arrays 210, 214, the sound signals received may be compared to the stored signal strength records to find a closest matching record which then determines the angles and distances from the microphone arrays 210, 214 to the meeting attendee 202-1. The more predefined attendee positions, the better the collaboration system 100 can be trained, and the more accurate and robust estimation can be obtained.

Reference is now made to FIG. 2B, which is a side view of collaboration equipment, a meeting attendee and measurements determined by the system of FIG. 1. The sound received from a mouth 236 of the meeting attendee 202-1 by the microphone array 210 has travelled a distance 238. The distance 238 determined by the collaboration system 100 may not be the shortest distance (i.e. horizontal distance) from the surface 222 of the collaboration apparatus 206 to the meeting attendee 202-1. Although the distance 238 may be used for the distance 216-1 discussed above with reference to FIG. 2A in the calculations discussed below with reference to FIGS. 2C-E, it may be more accurate to use a shortest, horizontal distance 240 from the surface 222 of the collaboration apparatus 206 to the meeting attendee 202-1 for the distance 216-1 discussed above with reference to FIG. 2A. The shortest, horizontal distance 240 may be calculated based on an angle 242 of elevation or depression between the mouth 236 of the meeting attendee 202-1 and the microphone array 210. It should be noted that the various microphones included in the microphone array 210 may be dispersed vertically and/or horizontally. Therefore a point 244 of where the distance 238 is determined from on the surface 222 may be predetermined as a point on the surface 222, for example, but not limited to, the middle of the microphone array 210, the bottom of the microphone array 210, a side of the microphone array 210 etc. It will be appreciated that the point 244 is generally used consistently for all distance measurements made using the microphone array 210. In some embodiments the angle 242 may not be determined by the collaboration system 100. In such embodiments, an assumption may be made about a vertical distance 246 between the point 244 and the mouth 236 of the meeting attendee 202-1 in a sitting position. The vertical distance 246 may then be used to determine the shortest, horizontal distance 240 based on the distance 238 using Pythagoras' Theorem. It should be noted that although the above discussion was made with respect to the distance 216-1 determined with respect to the microphone array 210, it will be appreciated that the above discussion also applies, mutatis mutandis, for other distance calculations described below with reference to FIGS. 2C-E from both the microphone array 210 and the microphone array 214.

Figure 2C:
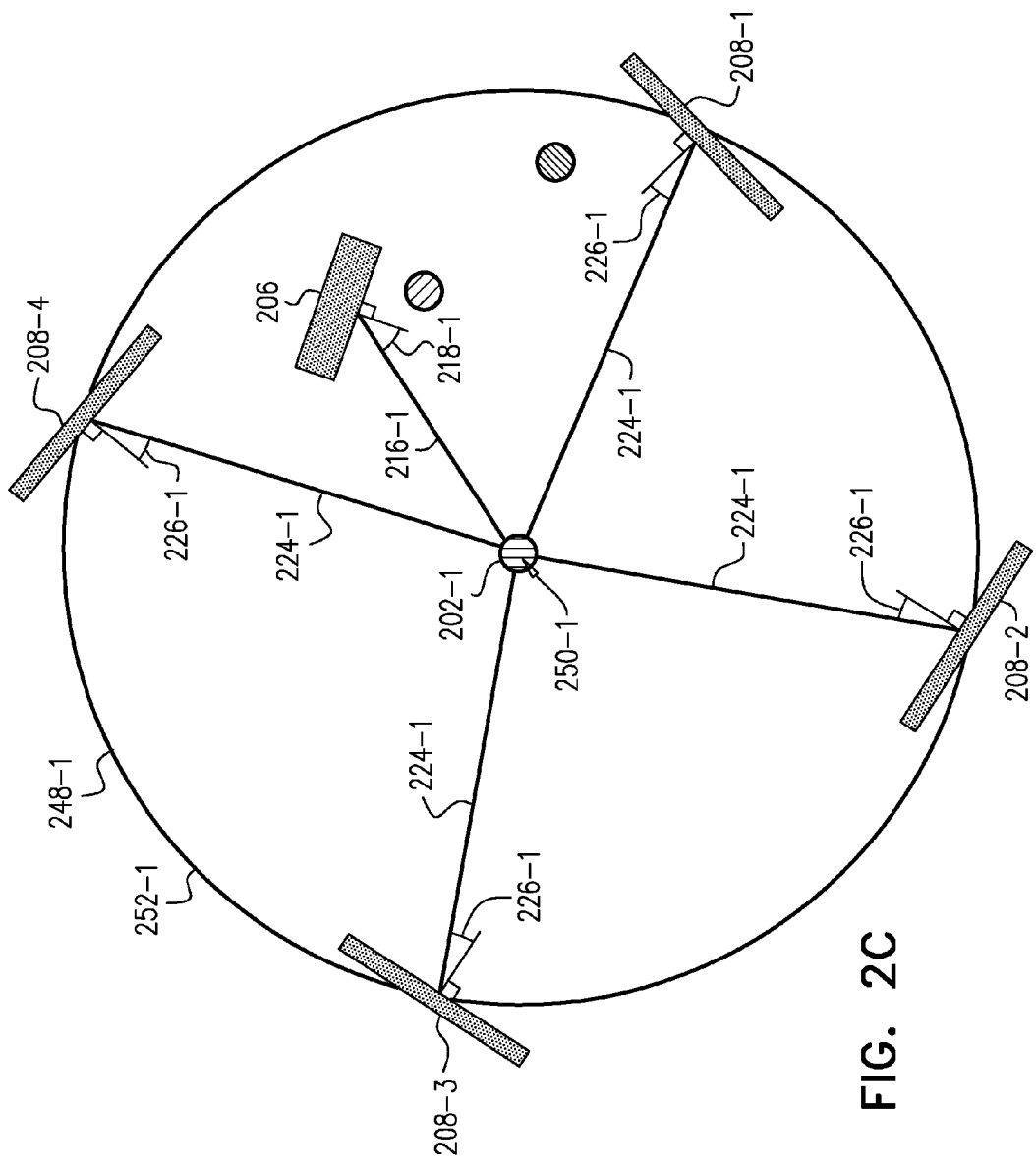
FIG. 2C is a plan view showing possible positions of a collaboration apparatus in the system of FIG. 1.

Reference is now made to FIG. 2C, which is a plan view showing possible positions of the collaboration apparatus 208 in the system 100 of FIG. 1. Once the distances 216-1, 224-1 and angles 218-1, 226-1 have been determined, the position of the collaboration apparatus 208 is still unknown as the orientation of the collaboration apparatus 208 is unknown. Based on the distances 216-1, 224-1 and angles 218-1, 226-1 determined so far, the collaboration apparatus 208 may be positioned at an unknown position on a circumference 252-1 of a circle 248-1, centered at a position 250-1 (known from the distance 216-1 and angle 218-1) of the meeting attendee 202-1. The circle 248-1 has a radius equal to the distance 224-1. FIG. 2C shows various possible positions of the collaboration apparatus 208, labelled at 208-1, 208-2, 208-3 and 208-4 by way of example only.

It will be appreciated that the position 250-1 and other positions determined or calculated by the collaboration system 100 may be expressed as a position relative to the collaboration apparatus 206 or relative to some other coordinate system, for example, but not limited to, a point in the collaboration room.

Figure 2D:
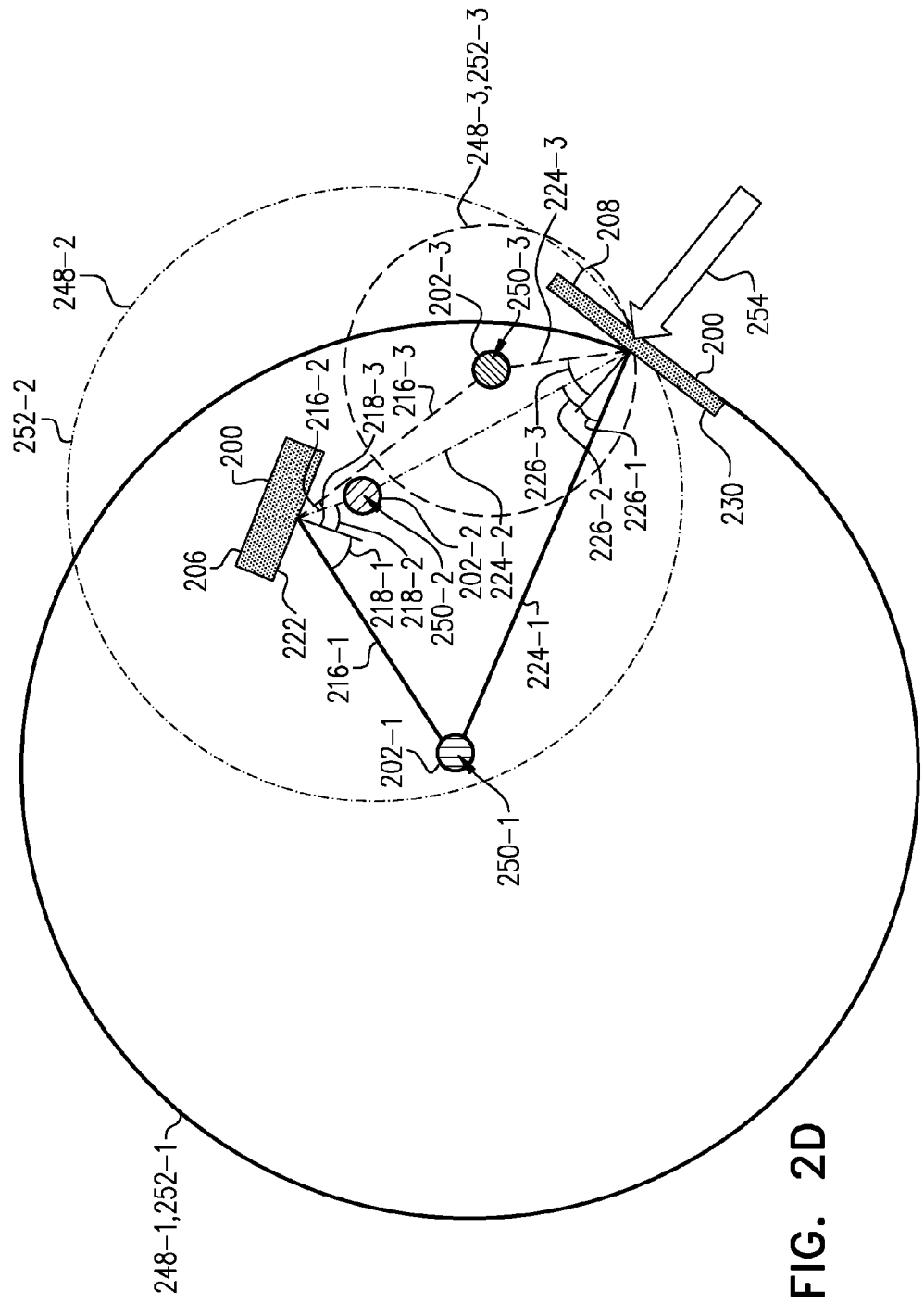
FIG. 2D is a plan view of the collaboration equipment, meeting attendees and additional measurements determined by the system of FIG. 1.

Reference is now made to FIG. 2D, which is a plan view of the collaboration equipment 200, meeting attendees 202 and additional measurements determined by the system 100 of FIG. 1. The collaboration system 100 determines distance and angle measurements from the surface 222 of the collaboration apparatus 206 and from the surface 230 of the collaboration apparatus 208 to meeting attendees 202-2, 202-3 in a similar manner that the distances 216-1, 224-1 and angles 218-1, 226-1 were determined for the meeting attendee 202-1. FIG. 2D shows the distances 216-2, 224-2 and angles 218-2, 226-2 for meeting attendee 202-2 and the distances 216-3, 224-3 and angles 218-3, 226-3 for meeting attendee 202-3.

The collaboration apparatus 208 may be positioned at a position on a circumference 252-2 of a circle 248-2, centered at a position 250-2 (known from the distance 216-2 and angle 218-2) of the meeting attendee 202-2 and with a radius equal to the distance 224-2. The collaboration apparatus 208 may be positioned at a position on a circumference 252-3 of a circle 248-3, centered at a position 250-3 (known from the distance 216-3 and angle 218-3) of the meeting attendee 202-3 and with a radius equal to the distance 224-3.

If the distances 216 and angles 218 are determined accurately, then an intersection (indicated by arrow 254) of the circumferences 252 of the circles 248 defines a position of the collaboration apparatus 208. It will be appreciated that due to various factors, the determination of the distances 216 and angles 218 may be inaccurate and therefore the position of the collaboration apparatus 208 may be determined at a point of closest proximity of the circumferences 252 of the circles 248. Therefore, the position of the collaboration apparatus 208 is calculated based on a proximity (closest proximity or intersection) of the circumference 252-1 of the circle 248-1, the circumference 252-2 of the circle 248-2 and the circumference 252-3 of the circle 248-3. The point of closest proximity may be determined by summing the distances or square of distances from different test points to the circumferences 252 and then selecting the test point having the smallest sum of distances or sum of square of distances as the point of closest proximity. Alternatively, the thickness of the circumferences 252 may be increased until all the circumferences 252 intersect.

Figure 2E:
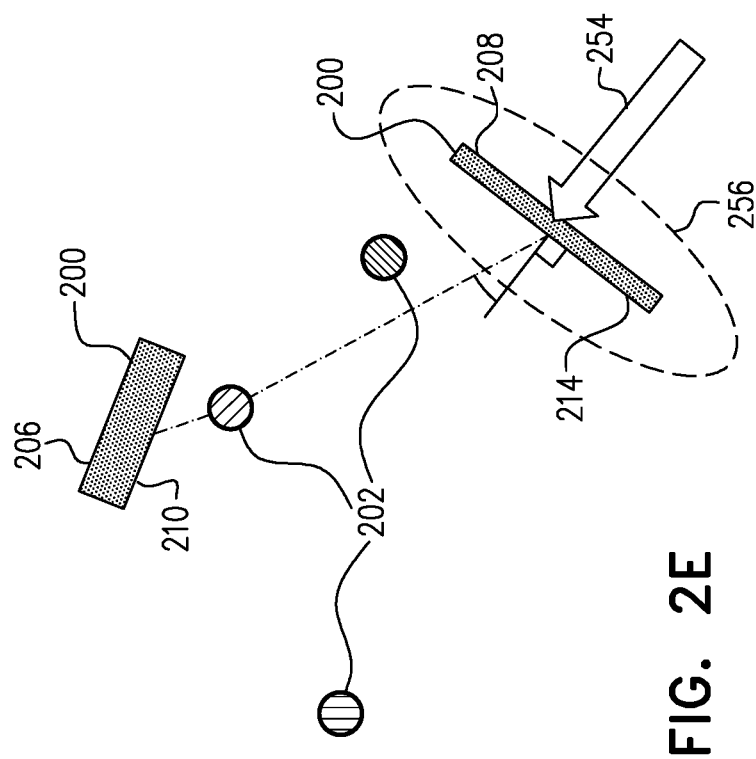
FIG. 2E is a plan view of the collaboration equipment showing calculation of an orientation of a collaboration apparatus and a presentation zone.

Reference is now made to FIG. 2E, which is a plan view of the collaboration equipment 200 showing calculation of an orientation of the collaboration apparatus 208 and a presentation zone 256. It was explained above with reference to FIG. 2D how the position (indicated by arrow 254) of the collaboration apparatus 208 is calculated from the proximity of the circles 248 (FIG. 2D). Once the position (arrow 254) of the collaboration apparatus 208 has been calculated, the orientation of the collaboration apparatus 208 in relation to the collaboration apparatus 206 (or other coordinate system, e.g., some point in the collaboration room) may be calculated using trigonometry based on the distances 216-1, 224-1 (FIG. 2D) and angles 218-1, 226-1 (FIG. 2D) (and/or the distances 216-2, 224-2 (FIG. 2D) and angles 218-2, 226-2 (FIG. 2D) and/or the distances 216-3, 224-3 (FIG. 2D) and angles 218-3, 226-3 (FIG. 2D)). It will be appreciated that although the orientation may be calculated based on one of the sets of distances and angles (e.g., the distances 216-1, 224-1 (FIG. 2D) and angles 218-1, 226-1 (FIG. 2D)) using more sets of distances and angles to calculate the orientation and averaging the calculated orientations may result in a more accurate calculation.

The presentation zone 256 may be defined based on the position of the collaboration apparatus 208. The presentation zone 256 may be defined as a certain distance either side of the collaboration apparatus 208. The size of the presentation zone 256 may be a function of an error associated with the calculation of the position of the collaboration apparatus 208. For example, if the error associated with the calculation of the position of the collaboration apparatus 208 is larger, the size of the presentation zone 256 is larger. An error is associated with the calculation of the position of the collaboration apparatus 208 when the three circles 248 do not intersect at the same point or there is an error associated with determining the distances and angles from the microphone arrays 210, 214, by way of example only.

It should be noted that the discussion above describes using speech from three meeting attendees 202 at three different positions. It will be appreciated that speech samples may be taken from one or two meeting attendees that are moving around the collaboration room at three different attendee positions. It should also be noted that more than three different attendee positions may be used to generate more than three circles. The intersection or closest proximity to the circumferences of the more than three circles may provide more robust and accurate results than three circles regarding the position of the collaboration apparatus 208. Using more than three different attendee positions may increase the likelihood that the circles all intersect at a single point or lead to a clearer definition of the closest proximity to the circumferences of the circles.

When a meeting starts, the collaboration system 100 samples speech received by the microphone array 210 and microphone array 214. If three different attendee positions are detected then this data may be used to determine the position of the collaboration apparatus 208. In accordance with an embodiment of the present disclosure, the collaboration system 100 uses the determined attendee positions to determine the position of the collaboration apparatus 208 if the determined attendee positions fulfil some minimum separation criteria. In other embodiments, there is no minimum separation criteria. In some embodiments, the collaboration system 100 determines the attendee positions periodically throughout a video conference and if the attendee positions (distances and/or angles) have changed (possibly greater than a certain distance, angle and/or by a certain percentage) then the position of the collaboration apparatus 208 is recalculated. It should be noted that additional speaker tracking systems may be deployed in the collaboration room and paired with each other. The additional speaker tracking systems may add accuracy to the calculations, improve tracking accuracy and robustness.

Reference is now made to FIG. 3, which is a first flow chart 300 showing exemplary steps in a method of operation of the system 100 of FIG. 1. For the sake of convenience the distances 216-1, 216-2, and 216-3 and the angles 218-1, 218-2 and 218-3 of FIG. 2D are now described by way of positions P1, P2 and P3 of the meeting attendees 202-1, 202-2, 202-3 (FIG. 2D), respectively. For example, the position P1 is determined by traversing from the point 244 (FIG. 2B) of the collaboration apparatus 206 (FIG. 2B) by the distance 216-1 at an angle 218-1 from the normal 220 (FIG. 2A). For the sake of convenience, the distances 224-1, 224-2 and 224-3 are now described as distances D1, D2 and D3, respectively; and the angles 226-1, 226-2 and 226-3 are now described as angles A1, A2 and A3, respectively. The circles 248-1, 248-2 and 248-3 are now described circles C1, C2 and C3, respectively.

The processor 132 is operative to determine, and store in the memory 134, the positions P1, P2, P3 (block 302) and the distances D1, D2, D3 (block 304) and angle A1 and optionally the angles A2 and A3 (block 306). The positions P1, P2, P3 may be determined (and stored) in terms of the distances 216-1, 216-2, and 216-3 and the angles 218-1, 218-2 and 218-3 of FIG. 2D and/or as vectors from the microphone array 210 without actually calculating and storing the positions P1, P2 and P3. The positions P1, P2, P3 are determined based on detecting speech from a first attendee position, a second attendee position and a third attendee position, respectively, by the microphone array 210 of the collaboration apparatus 206. The distances D1, D2, D3 and angle(s) A1, (optionally A2, A3) may be determined based on detecting speech from the first attendee position, the second attendee position and the third attendee position, respectively, by the microphone array 214 of the collaboration apparatus 208. In accordance with an embodiment of the present disclosure, the processor 132 is operative to calculate the positions P1, P2, P3 and the distances D1, D2, D3 and angle(s) A1, (optionally A2, A3) using time difference of arrival. In accordance with another embodiment of the present disclosure, the processor 132 is operative to determine: (i) each one of the positions P1, P2, P3 based on comparing audio signals detected by the microphone array 210; and (ii) each one of the distances D1, D2, D3 and angle(s) A1, (optionally A2, A3) based on comparing audio signals detected by the microphone array 214, to data produced by an artificial neural network as described above with reference to FIG. 2A. In accordance with an embodiment of the present disclosure, the artificial neural network may be calibrated using a large collaboration room and the data may be scaled down to smaller rooms.

The processor 132 is operative to retrieve, from the memory 134, the positions P1, P2, P3 of the first attendee position, the second attendee position and the third attendee position, respectively (block 308). The processor 132 is operative to retrieve, from the memory 134, the distances D1, D2, D3 from the first attendee position, the second attendee position and the third attendee position, respectively, to the microphone array 214 of the collaboration apparatus 208 (block 310). The processor 132 is operative to retrieve, from the memory 134, the angle(s) A1, (optionally A2, A3) (block 312) of the first attendee position (the second and third attendee positions, respectively) from the microphone array 214 of the collaboration apparatus 208.

The processor 132 is operative to define the circles C1, C2 and C3 (block 314). The position P1 and distance D1 define the circle C1 centered at position P1 with a radius D1. The position P2 and distance D2 define the circle C2 centered at position P2 with a radius D2. The position P3 and distance D3 define the circle C3 centered at position P3 with a radius D3. The processor is operative to calculate a position P4 (shown by arrow 254 in FIG. 2D) based on a proximity (closest proximity or intersection) of a circumference of the circle C1, a circumference of the circle C2 and a circumference of the circle C3 (block 316). The position P4 defines a position of the collaboration apparatus 208 relative to the collaboration apparatus 206 or some other suitable coordinate system.

The processor 132 is operative to calculate a first orientation result of the collaboration apparatus 208 based on the position P1 and the position P4 and the angle A1 (block 318). Optionally, an additional orientation result may be determined by the processor 132 based on the position P2, P4 and angle A2. The additional orientation result may be averaged with the first orientation result which may provide higher accuracy. Similarly, yet another orientation result may be determined by the processor 132 based on the position P3, P4 and angle A3. All three orientation results may be averaged which may provide higher accuracy. The processor 132 is operative to define the presentation zone 256 (FIG. 2E) based on the position P4 of the collaboration apparatus 208 (block 320).

The steps of blocks 302-320 may be performed by the same processor 132 or by different processors 132. For example, the step of block 302 may be performed by a processor disposed in the collaboration apparatus 206 and the steps of blocks 304-306 may be performed by a processor disposed in the collaboration apparatus 208, while the steps of blocks 308-320 may be performed by a processor disposed in a server.

Reference is now made to FIG. 4, which is a second flow chart 400 showing exemplary steps in a method of operation of the system 100 of FIG. 1. The processor 132 is operative to receive an indication that a user (one of the meeting attendees 202) is presenting using the collaboration apparatus 208 (block 402). The indication may be based on one or more of the following: a proximity measurement of the user to the collaboration apparatus 208 based on proximity sensors in the collaboration apparatus 208, by way of example; the user touching directly (e.g., with a finger) or indirectly (e.g., with a stylus) the collaboration apparatus 208; and an item of content being shared on the collaboration apparatus 208. The processor 132 is operative to, based on receiving the indication, start presenter tracking of the user (block 404). The presenter tracking step of block 404 is now described in more detail with reference to steps 406-410. The processor 132 is operative to: instruct a camera to capture images from the presentation zone 256 (block 406); identify the user in one or more of the captured images (block 408); and instruct the camera to zoom in to the user in the presentation zone 256 (block 410).

In practice, some or all of the functions of the processor 132 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
   retrieving, from a memory, a position P1, a position P2 and a position P3 of a first attendee position, a second attendee position and a third attendee position, respectively, wherein the positions P1, P2, P3 are determined based on detecting speech from the first attendee position, the second attendee position and the third attendee position, respectively, by a first microphone array of a video end-point;
   retrieving, from a memory, a distance D1, a distance D2 and a distance D3 from the first attendee position, the second attendee position and the third attendee position, respectively, to a second microphone array of a digital white board, wherein the distances D1, D2, D3 are determined based on detecting speech from the first attendee position, the second attendee position and the third attendee position, respectively, by the second microphone array, the position P1 and distance D1 defining a circle C1 centered at position P1 with a radius D1, the position P2 and distance D2 defining a circle C2 centered at position P2 with a radius D2, the position P3 and distance D3 defining a circle C3 centered at position P3 with a radius D3; and calculating a position P4 based on a proximity of a circumference of the circle C1, a circumference of the circle C2 and a circumference of the circle C3, the position P4 defining a position of the digital white board for use in defining a presentation zone based on the position P4 and for use in instructing a camera to zoom in to a user in the presentation zone.

2. The method according to claim 1, further comprising defining the presentation zone based on the position P4 of the digital white board.

3. The method according to claim 2, further comprising:
receiving an indication that the user is presenting using the digital white board; and
based on receiving the indication, staring presenter tracking of the user.

4. The method according to claim 3, wherein the indication is based on one or more of the following: a proximity measurement of the user to the digital white board; the user touching directly or indirectly the digital white board; and an item of content shared on the digital white board.

5. The method according to claim 3, further comprising:
instructing the camera to capture images from the presentation zone;
identifying the user in one or more of the captured images; and
instructing the camera to zoom in to the user in the presentation zone.

6. The method according to claim 1, further comprising determining the positions P1, P2, P3 and the distances D1, D2, D3.

7. The method according to claim 1, further comprising: calculating the positions P1, P2, P3 and the distances D1, D2, D3 using time difference of arrival; or determining each one of the positions P1, P2, P3 and each one of the distances D1, D2, D3 based on comparing audio signals detected by the first microphone array and second microphone array, respectively, to data produced by an artificial neural network.

8. The method according to claim 1, further comprising:
retrieving, from the memory, an angle A1 of the first attendee position from the second microphone array of the digital white board, wherein the angle A1 is determined based on detecting speech from the first attendee position by the second microphone array; and
calculating an orientation of the digital white board based on the position P1, the position P4 and the angle A1.

9. A system comprising: a processor; and a memory to store data used by the processor, wherein the processor is operative to:
retrieve, from the memory, a position P1, a position P2 and a position P3 of a first attendee position, a second attendee position and a third attendee position, respectively, wherein the positions P1, P2, P3 are determined based on detecting speech from the first attendee position, the second attendee position and the third attendee position, respectively, by a first microphone array of a video end-point;

retrieve, from the memory, a distance D1, a distance D2 and a distance D3 from the first attendee position, the second attendee position and the third attendee position, respectively, to a second microphone array of a digital white board, wherein the distances D1, D2, D3 are determined based on detecting speech from the first attendee position, the second attendee position and the third attendee position, respectively, by the second microphone array, the position P1 and distance D1 defining a circle C1 centered at position P1 with a radius D1, the position P2 and distance D2 defining a circle C2 centered al position P2 with a radius D2, the position P3 and distance D3 defining a circle C3 centered at position P3 with a radius D3; and calculate a position P4 based on a proximity of a circumference of the circle C1, a circumference of the circle C2 and a circumference of the circle C3, the position P4 defining a position of the digital white board for use in defining a presentation zone based on the position P4 and for use in instructing a camera to zoom in to a user in the presentation zone.

10. The system according to claim 9, wherein the processor is operative to define the presentation zone based on the position P4 of the digital white board.

11. The system according to claim 10, wherein the processor is operative to:
receive an indication that the user is presenting using the digital white board; and
based on receiving the indication, start presenter tracking of the user.

12. The system according to claim 11, wherein the indication is based on one or more of the following: a proximity measurement of the user to the digital white board; the user touching directly or indirectly the digital white board; and an item of content shared on the digital white board.

13. The system according to claim 11, wherein the processor is operative to:
instruct the camera to capture images from the presentation zone;
identity the user in one or more of the captured images; and
instruct the camera to zoom in to the user in the presentation zone.

14. The system according to claim 9, wherein the processor is operative to determine the positions P1, P2, P3 and the distances D1, D2, D3.

15. The system according to claim 9, wherein the processor is operative to: calculate the positions P1, P2, P3 and the distances D1, D2, D3 using time difference of arrival; or determine each one of the positions P1, P2, P3 and each one of the distances D1, D2, D3 based on comparing audio signals detected by the first microphone array and second microphone array, respectively, to data produced by an artificial neural network.

16. The system according to claim 9, wherein the processor is operative to:
retrieve, from the memory, an angle A1 of the first attendee position from the second microphone array of the digital white board, wherein the angle A1 is determined based on detecting speech from the first attendee position by the second microphone array; and
calculate an orientation of the digital white board based on the position P1, the position P4 and the angle A1.

17. The system according to claim 9, wherein the processor and memory are implemented in at least one of the following: a video conference server; a cloud computing environment; a video end-point; and a digital white board.

18. A software product, comprising a non-transient computer-readable medium in which program instructions are stored, which instructions, when read by a central processing unit (CPU), cause the CPU to:

retrieve, from a memory, a position P1, a position P2 and a position P3 of a first attendee position, a second attendee position and a third attendee position, respectively, wherein the positions P1, P2, P3 are determined based on detecting speech from the first attendee position, the second attendee position and the third attendee position, respectively, by a first microphone array of a video end-point;

retrieve, from a memory, a distance D1, a distance D2 and a distance D3 from the first attendee position, the second attendee position and the third attendee position, respectively, to a second microphone array of a digital white board, wherein the distances D1, D2, D3 are determined based on detecting speech from the first attendee position, the second attendee position and the third attendee position, respectively, by the second microphone array, the position P1 and distance D1 defining a circle C1 centered at position P1 with a radius D1, the position P2 and distance D2 defining a circle C2 centered at position P2 with a radius D2, the position P3 and distance D3 defining a circle C3 centered at position P3 with a radius D3; and calculate a position P4 based on a proximity of a circumference of the circle C1, a circumference of the circle C2 and a circumference of the circle C3, the position P4 defining a position of the digital white board for use in defining a presentation zone based on the position P4 and for use in instructing a camera to zoom in to a user in the presentation zone.

* * * * *

UNITED STATES PATENT AND TRADEMARK OFFICE
CERTIFICATE OF CORRECTION

PATENT NO. : 9,883,142 B1  
APPLICATION NO. : 15/464366  
DATED : January 30, 2018  
INVENTOR(S) : HaoHai Sun It is certified that error appears in the above-identified patent and that said Letters Patent is hereby corrected as shown below:

On the Title Page

In the Second Page, Other Publications, Column 1, Line 8, "Calling" to read as -- Ceiling --.

In the Claims

Column 11, Line 24, in Claim 3, "staring" to read as -- starting --.

Column 12, Line 12, in Claim 9, "al" to read as -- at --.

Column 12, Line 40, in Claim 13, "identity" to read as -- identify --.

Signed and Sealed this  
Tenth Day of April, 2018

Andrei Iancu  
*Director of the United States Patent and Trademark Office*